United States Patent [19]

Vitins

[11] 4,287,547

[45] Sep. 1, 1981

[54] METHOD AND APPARATUS FOR FAULT AND/OR FAULT DIRECTION DETECTION

[75] Inventor: Michael Vitins, Zurich, Switzerland

[73] Assignee: BBC Brown, Boveri & Co. Ltd., Baden, Switzerland

[21] Appl. No.: 66,783

[22] Filed: Aug. 15, 1979

[30] Foreign Application Priority Data

Aug. 29, 1979 [CH] Switzerland .......................... 9105/78

[51] Int. Cl.³ .......................... H02H 3/40; H02H 7/26
[52] U.S. Cl. ........................................ 361/82; 324/52; 361/86
[58] Field of Search ...................... 361/82, 83, 84, 80, 361/81, 86, 87, 85, 79; 324/52

[56] References Cited

U.S. PATENT DOCUMENTS

| 3,379,934 | 4/1968 | Hoel et al. | 361/80 |
| 3,731,152 | 5/1973 | Rockefeller | 361/80 |
| 3,878,460 | 4/1975 | Nimmersjo | 361/82 |
| 4,128,805 | 12/1978 | Lanz | 361/80 X |
| 4,212,046 | 7/1980 | Andow et al. | 361/80 |

Primary Examiner—Patrick R. Salce
Attorney, Agent, or Firm—Werner W. Kleeman

[57] ABSTRACT

By forming current jump or surge signals and voltage jump or surge signals, in accordance with the changes as a function of time of the line current and line voltage in relation to the steady-state course of the current and voltage and comparison of such jump or surge signals with a threshold value, dependent upon the other jump or surge signal, or an appropriate threshold value function, there can be derived trip boundaries in the surge signal plane. Exceeding such trip boundaries in a direction from the inside towards the outside can be utilized as a fault criterion for producing a trip signal. With suitable trip boundaries, at least inclined in sections towards the coordinate axes owing to the aforementioned dependency of the comparison threshold values, which trip boundaries also may be curved, and arranged in spaced relationship from the coordinate-null point in the four quadrants of the surge signal-coordinate system there is realized a rapid fault detection which is comparatively foolproof against faulty tripping and by determining the quadrants where there occurs the initial exceeding of the threshold value, there likewise can be realized an equally rapid and positive fault-direction detection.

19 Claims, 10 Drawing Figures

METHOD AND APPARATUS FOR FAULT AND/OR FAULT DIRECTION DETECTION

BACKGROUND OF THE INVENTION

The present invention relates to a new and improved method and apparatus for fault and/or fault direction detection.

Generally speaking, the method and apparatus for the fault and/or fault direction detection at electrical lines contemplates forming current surge or jump signals and voltage surge or jump signals in accordance with the changes as a function of time of the line current and line voltage, respectively, in relation to the steady-state current and voltage course. The formed current surge and voltage surge signals experience a threshold value comparison and, if desired, a sign comparison.

A method of this type and, equally, equipment for the performance thereof, have become known to the art from German Patent Publication No. 2,353,424 and the corresponding U.S. Pat. No. 3,878,460. That prior art teaching contemplates subjecting a current and a voltage surge signal, caused by a fault or a load exchange, to a sign comparison and each for itself to a threshold or limit value comparison. An equality or inequality of the signs, as the case may be, in an indicia for a reverse direction of forward direction of the fault or load change, whereas a conjunctive logical coupling of both surge or jump signals exceeding the threshold value can be employed as prerequisite for tripping. In consideration of the trip sensitivity such method is comparatively markedly dependent upon the impedance at the reverse side of the measuring location (source impedance) and exhibits low security against faulty tripping.

SUMMARY OF THE INVENTION

Therefore, with the foregoing in mind it is a primary object of the present invention to provide an improved method and apparatus for fault and/or fault direction detection which is not afflicted with the aforementioned limitations and drawbacks of the prior art proposal discussed above.

Another and more specific object of the present invention aims at providing a fault and/or fault direction-detection method and apparatus for the performance thereof, which manifests itself by increased security against faulty tripping and comparatively low dependency upon the reverse or source impedance.

Now in order to implement these and still further objects of the invention, which will become more readily apparent as the description proceeds, the method aspects of the present development are manifested by the features that there is accomplished for at least one of the surge signals a comparison with at least one threshold value dependent upon the other surge signal. If the threshold value is exceeded or fallen below then there is derived a trip or blocking signal for a protective device.

As stated, the invention is not only concerned with the method aspects, but also relates to apparatus for the performance thereof wherein there is provided a respective current measuring converter and voltage measuring converter. Connected with the output of each of the current measuring converter and voltage measuring converter is a respective current surge signal transmitter and voltage surge signal transmitter by means of a current signal transmission channel and a voltage signal transmission channel, respectively. In at least one of these signal transmission channels there is arranged a function generator following the related surge signal transmitter. The outputs of both signal transmission channels are connected with a comparator circuit or comparator having a fault detection output for a subsequently arranged protective circuit.

What is of extreme significance for the inventive solution is, among other things, that the surge or jump signals of current and voltage are not each compared by themselves with constant threshold or limit values, rather with threshold values dependent in each case upon other surge or jump signals in a predetermined manner. At a coordinate system (surge or jump signal plane) formed by both surge signals as the coordinate axes, there are then realized trip boundaries which are inclined with respect to the coordinate axes or possess inclined sections. These sections also can be infinite, so that with appropriately variable inclination there can be produced curved trip boundaries. Such trip boundaries can be accommodated in different ways to the network and line configurations and impedance conditions which arise during practice, especially the variable ranges of the source impedance, in the sense of reliable tripping or blocking, and furthermore, permit of a reliable fault direction detection. Two different possibilities are available for the realization thereof. First of all, one of both surge signals can be compared with a predetermined function of the other surge signal as threshold value function, and secondly, there can be formed a predetermined linking of both surge signals and comparison with a fixed threshold or limit value, for instance null.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
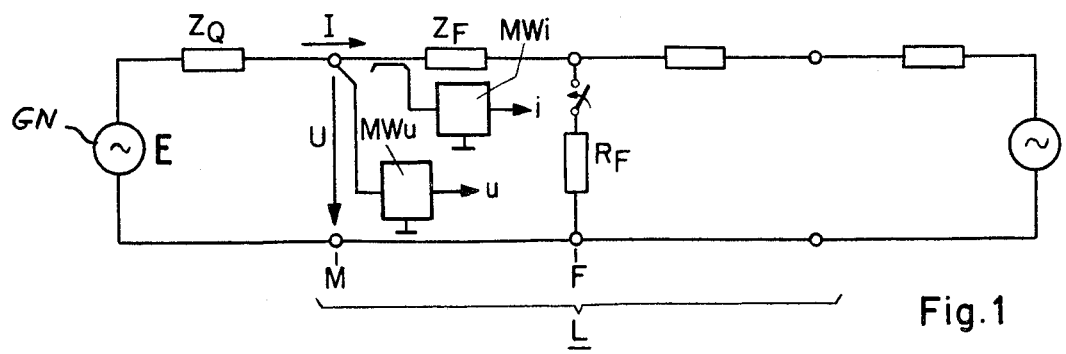
FIG. 1 is a schematic network diagram having a measuring location or site for fault monitoring.

Describing now the drawings, FIG. 1 illustrates by way of example and not limitation a simple network configuration as an exemplary field of application for the invention which has a line or network L fed at both ends, i.e., a double-infeed line or network L, and a measuring site or location M. At the measuring location M the line current I and the line voltage U are converted by means of a current measuring converter MWi and a voltage measuring converter MWu into a current signal i and a voltage signal u. At the reverse side of the measuring location M there is arranged a generator GN with the open-circuit voltage E and the source impedance $Z_Q$. A fault occurrence can be visualized by connecting a fault impedance $R_F$, usually resistive, at the fault location or site F, which, in this case, is located in the forward direction with respect to the measuring location M and governs the fault-line impedance $Z_F$ between the measuring location M and the fault location F.

Figure 2A:
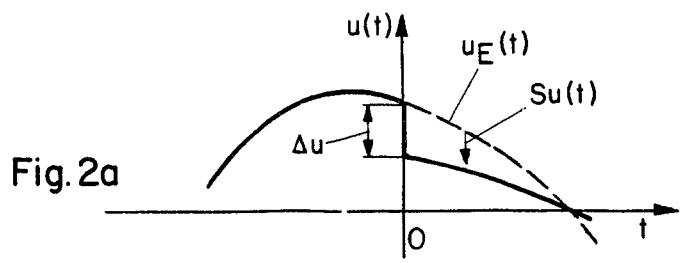
FIGS. 2a and 2b show illustratively the course as a function of time of a voltage surge signal and current surge signal, respectively.
Figure 2B:
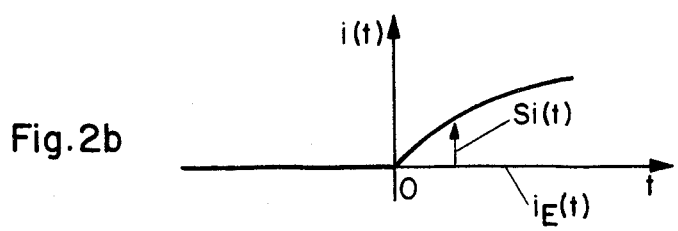

For such conditions there is realized, during the course as a function of time of the current signal i(t), according to the showing of FIG. 2b, while assuming a disappearingly small, static operating current $i_E(t)$, in relation to the short-circuit or fault currents from the fault occurrence at t=O, an ascent of the current signal i(t) beginning with null with finite ascent rate, which is governed by the inductive parts of the source impedance $Z_Q$ and the fault-line impedance $Z_F$. With this illustration there is not taken into account the travel time of the traveling waves between the fault location F and the measuring location M, following which there begins the current ascent at the measuring location M which is brought about by the fault or short-circuit. The same is also equally true for the course as a function of time of the voltage signal u(t), according to the showing of FIG. 2a, wherein at t=O there occurs a surge-like or step-like descent by the value Δu during the course of the static operating voltage $U_E(t)$. The last-mentioned voltage has been indicated in FIG. 2a in broken lines as a continuation of the voltage course prior to fault occurrence. Following the aforementioned starting surge or jump by Δu there results a voltage-surge signal Su(t) as the difference between the, for instance simulated, continuation of the operating voltage $u_E(t)$ and the voltage signal u(t) after fault occurrence. Owing to the operating current, assumed to be equal to null, there is realized according to the showing of FIG. 2b a current-surge signal Si(t), whose course as a function of time, after occurrence of the fault, corresponds to that of the current signal i(t).

Figure 3:
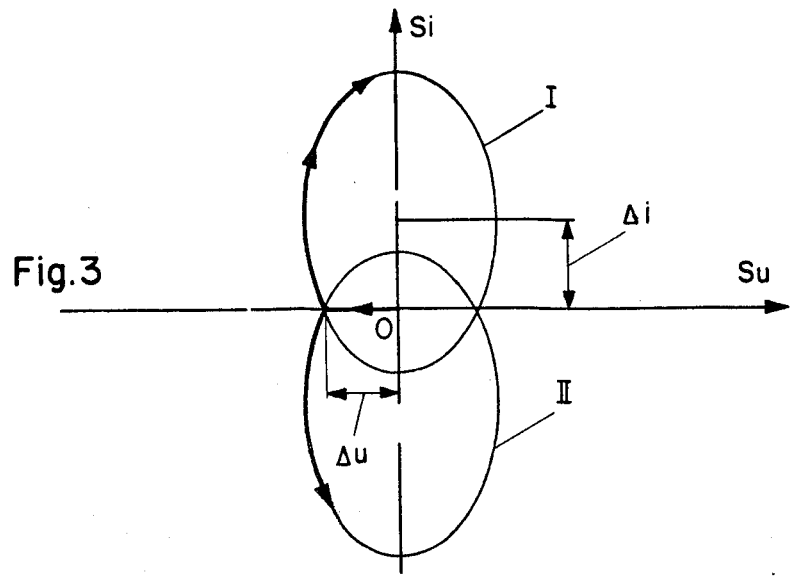
FIG. 3 illustrates trajectories of the current and voltage surge signals for fault-forward direction and fault-reverse direction.

Now in FIG. 3 there have been illustrated two trajectories I and II in accordance with the functional correlation between Si and Su for fault-forward direction or condition (I) and fault-rearward direction or condition (II). In this case there are present essentially elliptical transition curves which pass from a point, which in each case corresponds to a value pair Si, Su prevailing at a given point in time, in clockwise and counterclockwise direction, respectively. With the conditions portrayed in FIGS. 2a and 2b there initially prevails a section Δu at the Su-axis, corresponding to the starting surge or jump of the voltage. Thereafter, there merge the elliptical curve sections which distance themselves from the Su-axis and correspond to the ascending current-surge signal Si. Because of the impossibility of a surge-like current course, the trajectories always start at the Su-axis or at the coordinate-null point Si=O, Su=O. As can be determined by analytic evaluation of the current and voltage conditions, with a network configuration of the type shown in FIG. 1, the Si-coordinate of the ellipse-center point corresponds to the known current shift Δi. What is important at this point is to mention that the position and, in particular, the throughpass-directional sense of the trajectories unambiguously determine the fault direction.

Furthermore, also different source impedances can be expressed by virtue of the shape and size of the trajectories. This has been represented in FIG. 4 by a trajectory III with the same assumed fault impedance $R_F$ and the same fault distance or fault-line impedance $Z_F$, for a large value of the source or reverse impedance, by a trajectory IV for an intermediate value of the source or reverse impedance, and by a trajectory V for a lower value of the source or reverse impedance. Moreover, the general size of both ellipse-major axes are correspondingly conversely dependent upon the fault impedance $R_F$, so that with the aid of defined trip boundaries in the surge signal plane there is basically possible, on the one hand, differentiation, in accordance with a predetermined boundary, between still permissible load conditions and, on the other hand, faults.

Figure 5:
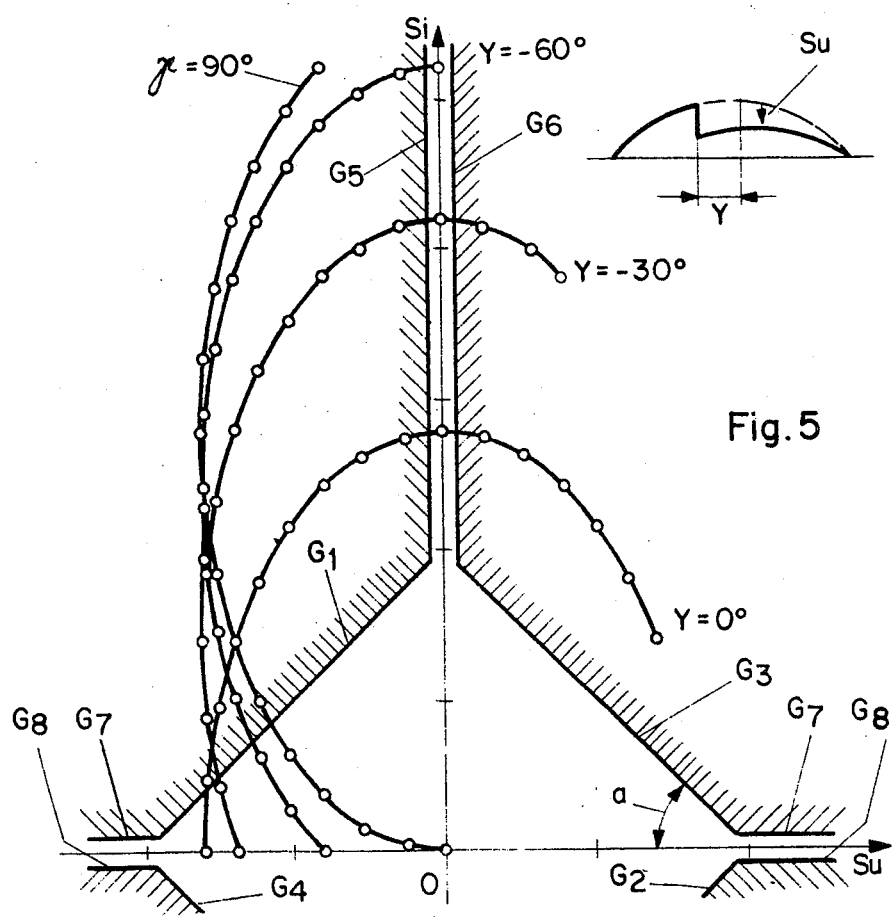
FIG. 5 illustrates a group of trajectories in the surge signal plane for the same network and fault configuration for different phase of the fault occurrence prior to the voltage reaching a maximum.

Now in FIG. 5 there is shown such trip region having four trip boundaries $G_1$, $G_2$, $G_3$ and $G_4$, each arranged in a respective quadrant of the coordinate system and inclined with respect to the Su-coordinate axis at an angle a. Additionally, there are further provided trip boundaries $G_5$, $G_6$, $G_7$ and $G_8$ each of which are located at slight spacing from the coordinate-axes and parallel thereto. These additional trip boundaries $G_5$, $G_6$, $G_7$ and $G_8$ correspond to a surge or jump signal having a constant threshold or limit value. These last-mentioned trip boundaries serve only for additional monitoring purposes, for instance an additional direction detection, and, if desired, could be replaced or augmented by a sign comparison of both surge signals with one another. What is important, however, are the inclined trip boundaries $G_1$, $G_2$, $G_3$ and $G_4$, which render possible a rapid fault direction determination and an equally rapid fault detection.

Figure 6:
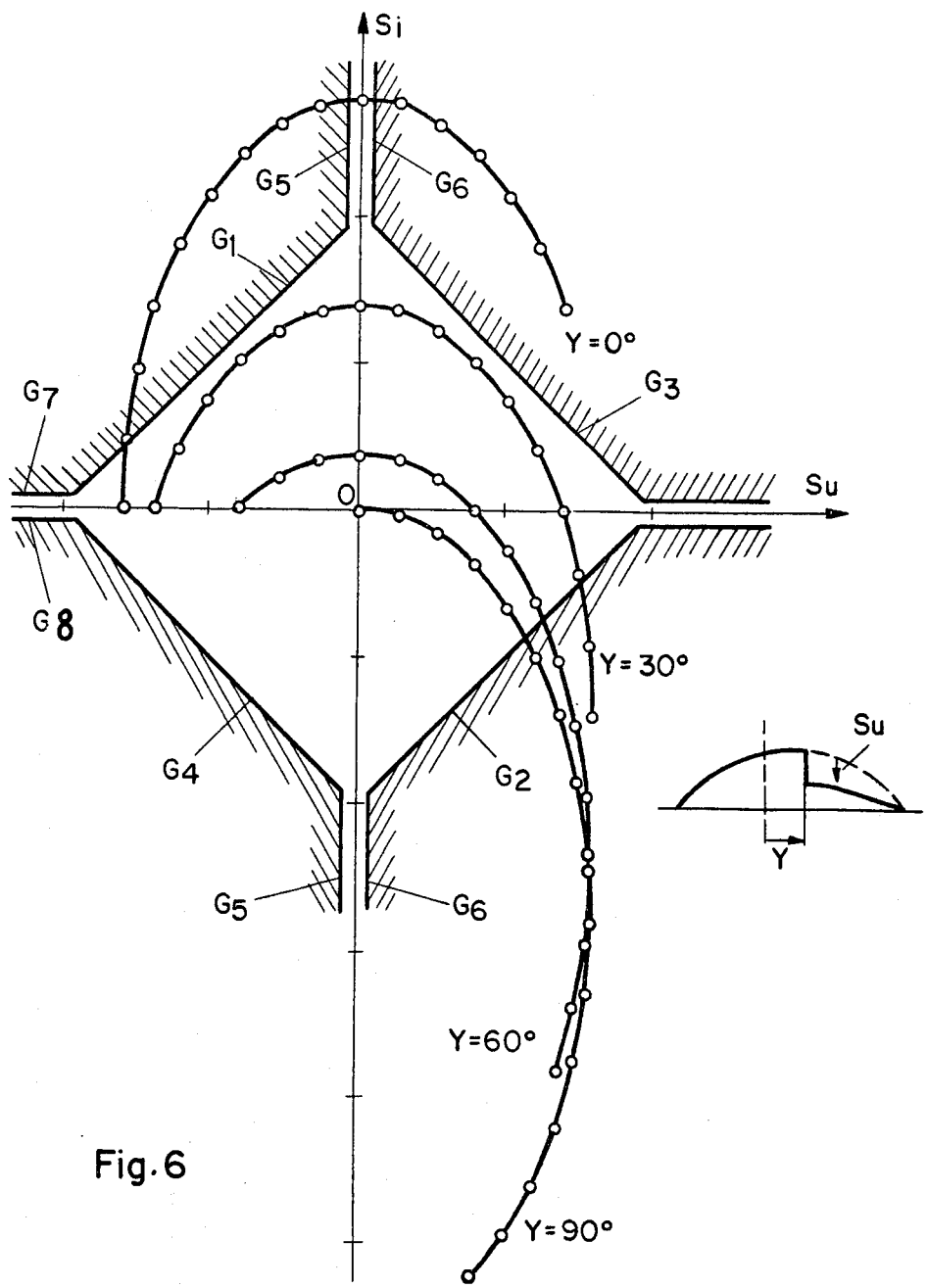
FIG. 6 illustrates a group of trajectories, corresponding to FIG. 5, however for different phases of the fault occurrence after the maximum voltage.

The plotted trajectories, each of which are valid for a certain phase angle γ of the fault occurrence prior to reaching the voltage maximum, demonstrate that in the event of faults in the forward direction and fault occurrence at the region between 0° and 90° before reaching the maximum voltage, initially, in any event, there will be exceeded the trip boundary $G_1$ during passage of the trajectories. In corresponding manner FIG. 6 illustrates for different phase angle γ, following attainment of the maximum voltage, that for faults in the forward direction and in the mentioned phase angle range of the occurrence, there is initially always exceeded the trip boundaries $G_1$ or $G_2$ upon passage of the trajectories. In toto, then, the first time that the trajectories exceed the trip boundaries in the second and fourth quadrants constitutes an unambiguous criterion for a fault in the forward direction. Additionally, in the event of load surges below certain limits or thresholds, the trajectories remain within the trip region defined by the inclined boundaries, so that there is also afforded a fault detection.

Figure 4:
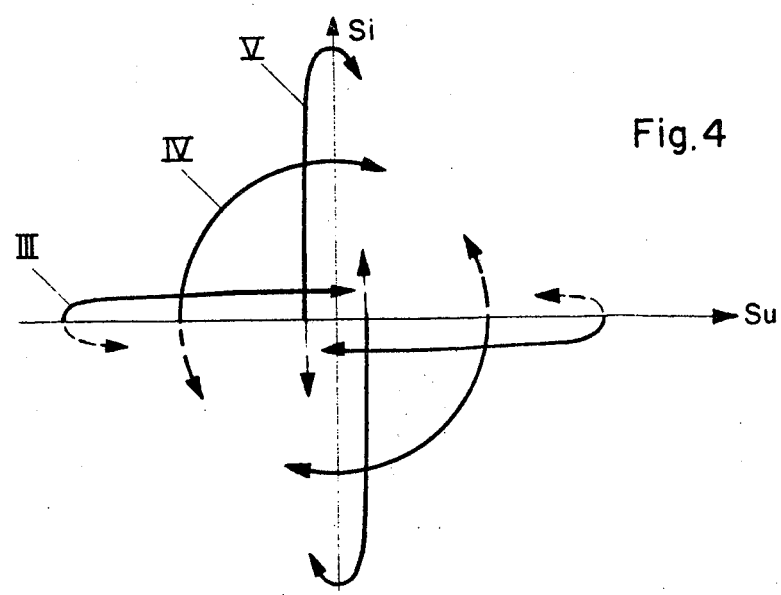
FIG. 4 illustrates trajectories for different reverse impedance with the same fault impedance in the surge signal plane.

Let it be assumed for instance that the trajectories III, IV and V of FIG. 4 correspond to load conditions which are still permissible and do not require any tripping. This corresponds to a threshold load condition for different reverse or source impedances. Then there has been found to be apparently exceptionally suitable a trip boundary configuration having four inclined sections $G_1$, $G_2$, $G_3$ and $G_4$, according to the showings of FIGS. 5 and 6, respectively, in order to eliminate faulty tripping. Only axially parallel trip boundaries, as are realized with a threshold value comparison of the surge signals, on the other hand can hardly avoid that there occurs an intersection, especially with the intermediate trajectory IV, and thus, leads to faulty tripping. A further advantage of the inclined, linear trip boundaries additionally resides in the fact that there is rapidly attained the threshold or boundary upon passing of the related trajectory, as will be best realized, for instance, from FIG. 5, but equally also from FIG. 6. As a practical matter there must be reckoned with, for instance, time intervals of about 1 to 5 milliseconds between fault occurrence and arrival of the traveling waves at the measuring location M and fulfillment of the fault criterion.

The illustrated trajectories are only related to the fundamental frequency and operating frequency components of the surge or jump signals. Corresponding conditions can be realized by conventionally filtering out higher frequency components to such a degree that, there is still insured for the rapid adjustment of the surge signals, and, especially the voltage-surge signal which appears with steep transition. However, it is advantageous if there is provided a certain non-sensitivity of the trip region and the trip boundary configuration to higher frequency transients, because such places lesser requirements upon filtering. Inclined trip boundaries of the type shown in FIGS. 5 and 6 have such non-sensitivity to a comparatively high degree, because the corresponding transient trajectory components preferably are located at the region about the coordinate-null point or origin.

Continuing, there now will be considered on the basis of the circuit configurations illustrated in FIGS. 7 to 10 possible embodiments of circuitry for practicing the teachings of the invention, and equally, different trip boundary configurations.

Figure 7:
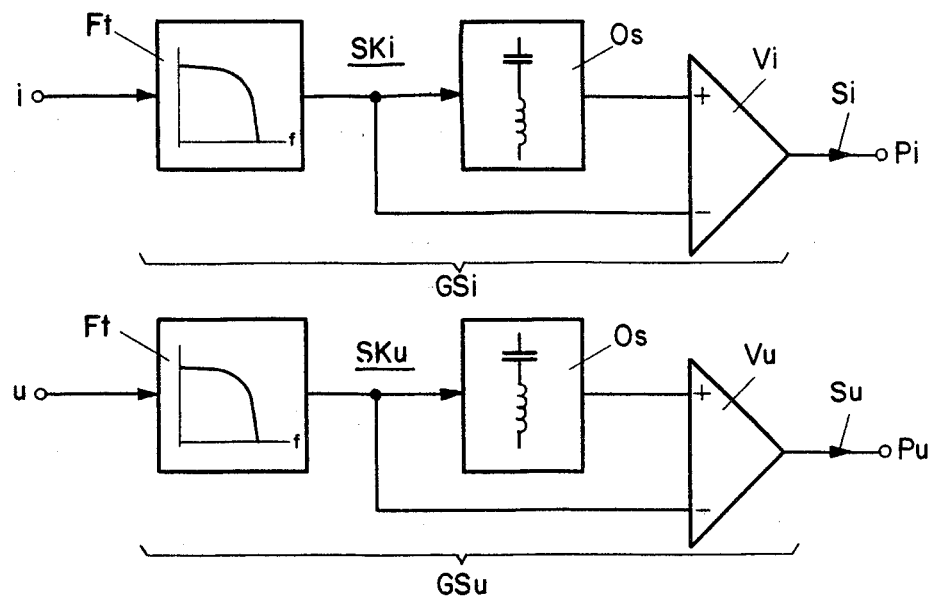
FIG. 7 is a principle circuit diagram for generating current and voltage surge signals.

The circuit section or portion, shown in FIG. 7, will be seen to comprise a signal transmission channel SKi, to which there is applied a current signal i, and a signal transmission channel SKu, to which there is applied a voltage signal u. The signal transmission channel SKi contains a current surge-signal transmitter GSi and the signal transmission channel SKu contains a voltage surge-signal transmitter GSu. Each of these signal transmission channels SKi and SKu is provided at its input side with a respective input filter Ft which suppresses the higher harmonics, following which there is connected in circuit a respective oscillator Os which is tuned to the operating frequency, the output of each such oscillator Os, in its steady-state, static condition, following the course as a function of time of the related current signal and voltage signal, respectively. The filtered current signal SKi and the filtered voltage signal SKu is then subtracted from the output of the related oscillator Os in an associated differential amplifier Vi and Vu, respectively. After the oscillating oscillator, in accordance with its energy content following a change of its input signal, also after a fault occurrence with correspondingly rapid change of the voltage signal u and the current signal i, has initially continued without change the previously prevailing course as a function of time of its sinusoidal output signal, there appears at the related output Pi and Pu of the differential amplifiers Vi and Vu, respectively, and thus at the signal channel GSi and GSu, respectively, the required current surge signal Si and voltage surge signal Su.

Figure 8:
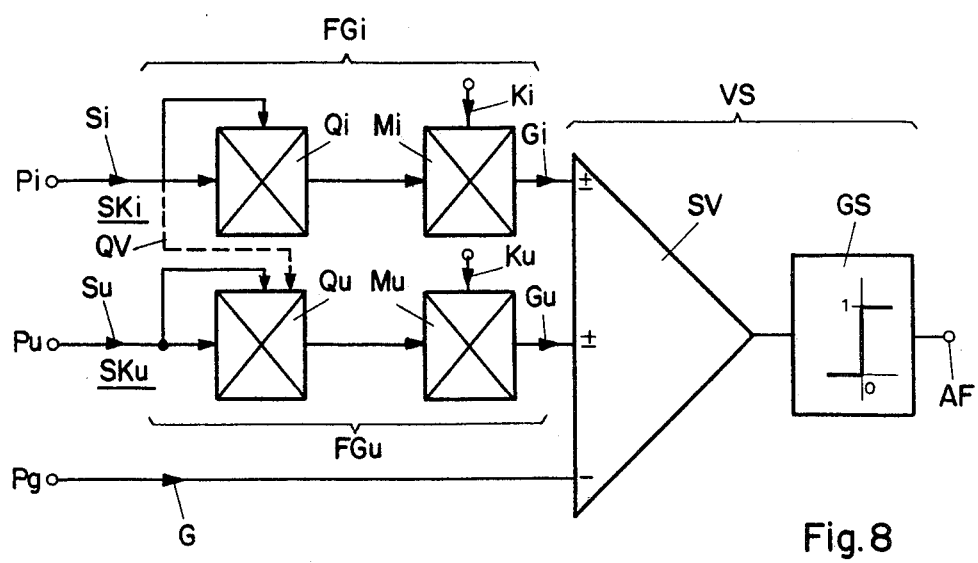
FIG. 8 is a principle circuit diagram for the comparison of the surge signals with surge signal dependent-threshold value functions.

The subsequently connected circuit section or portion, as shown in FIG. 8, having the correspondingly designated inputs Pi and Pu connected at the outputs Pi and Pu of the signal channels SKi and SKu of the circuit of FIG. 7, contains in the corresponding channels a respective function generator FGi and FGu for generating a threshold value function Gi and Gu, respectively, which is dependent upon the current surge signal Si and the voltage surge signal Su, respectively. In the embodiment under discussion there is contemplated the formation of a respective whole rational function, specifically a quadratic function, by means of a squarer circuit Qi and Qu, following each of which there is connected a respective multiplier Mi and Mu for introducing a constant factor Ki and Ku, respectively.

In principle, it would now be possible to compare the threshold value function Gi with the voltage surge signal Su and the threshold value function Gu with the current surge signal Si, so that following logical coupling of the binary comparison result there could be obtained an appropriate number of curved trip boundaries. In the embodiment of FIG. 8 there is disclosed a more general solution in that the outputs of both function generators FGi and FGu are connected at inverting or non-inverting inputs of a summation amplifier SV. A further, inverting input of such summation amplifier SV has applied thereto, by means of an input Pg, a fixed threshold or limit value G, which, if desired, also may be suitably adjustable. The summation amplifier SV together with a subsequent null-threshold value switch or sign detector GS forms a comparison circuit or comparator VS having a fault detection output AF. The output-binary values of the fault detection output AF have correlated therewith a position of the relevant operating point to the one or other side of a trip boundary. With the circuit explained by way of example, this trip boundary is realized by a function of the current surge signal and voltage surge signal of the type $\pm K \cdot Si^2 \pm Ku \cdot Su^2 - G = 0$, for instance a null point-symmetrical ellipse according to FIG. 8a as the trip boundary $G_9$ in the surge signal plane.

Figure 8A:
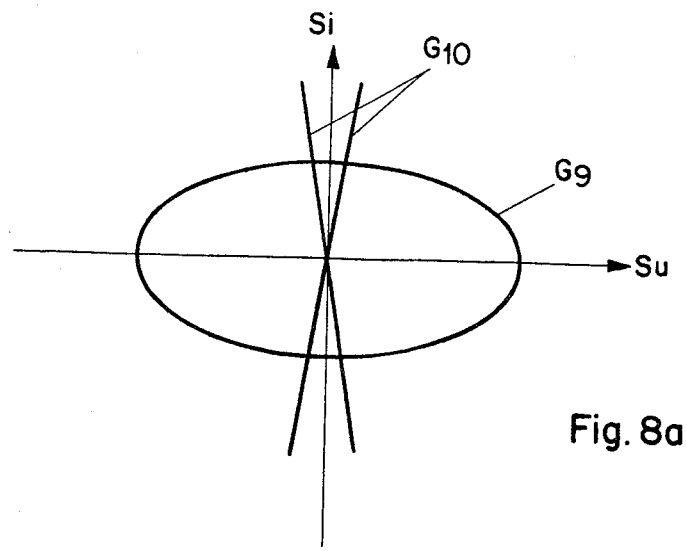
FIGS. 8a and 8b respectively show different curved trip boundaries in the surge signal plane, generated by means of a circuit of the type shown in FIG. 8.

By carrying out circuit variations, which will be evident to those skilled in the art, it is possible to obtain further types of trip boundaries, for instance with $G = 0$ and dispensing with the squarer circuits and also one of both multipliers Mi, Mu there can be obtained straight lines through the coordinate-null point or origin as trip boundaries $G_{10}$ in FIGS. 8a which fullfil a similar function as the boundaries $G_5$ to $G_8$ in FIGS. 5 and 6.

Figure 8B:
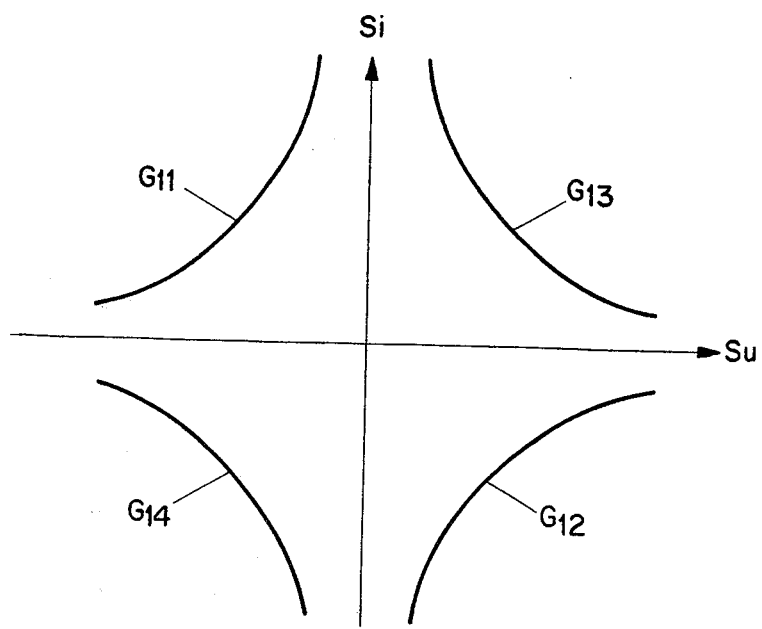

Furthermore, as shown with broken lines in FIG. 8, by means of a cross connection QV between the signal channels SKi and SKu, and instead of the Su-connection or terminal leading to the second squarer input, while assuming that there is eliminated the remaining signal channel SKi with its connection at the related input of the amplifier SV, there can be obtained a hyperbolic function of the type $\pm Ku \cdot Su \cdot Si = G$. With appropriate sign selection there can be realized in this way the hyperbolic curve boundary pairs $G_{11}$, $G_{12}$ and $G_{13}$, $G_{14}$, according to the showing of FIG. 8b, which define an exceptionally suitable trip region in the sense of the explanations made heretofore with respect to the trip boundaries $G_1$ to $G_8$ of FIGS. 5 and 6 in terms of security against faulty tripping and insensitivity to harmonics. For both hyperbolic curve pairs $G_{11}$, $G_{12}$ and $G_{13}$, $G_{14}$ there is to be provided two arrangements of the type described in conjunction with FIG. 8 having conjunctive logic coupling of the related trip outputs AF. A fault direction detection is here likewise possible, as for the trip boundaries discussed above in conjunction with FIGS. 5 and 6, in the manner that there is carried out a time sequence discrimination with respect to exceeding the trip boundaries in the second and fourth quadrants, on the one hand, and in the first and third quadrants on the other hand, wherein the first case is correlated with the forward direction and the second case with the rearward direction as concerns the measuring location or site M.

Figure 9:
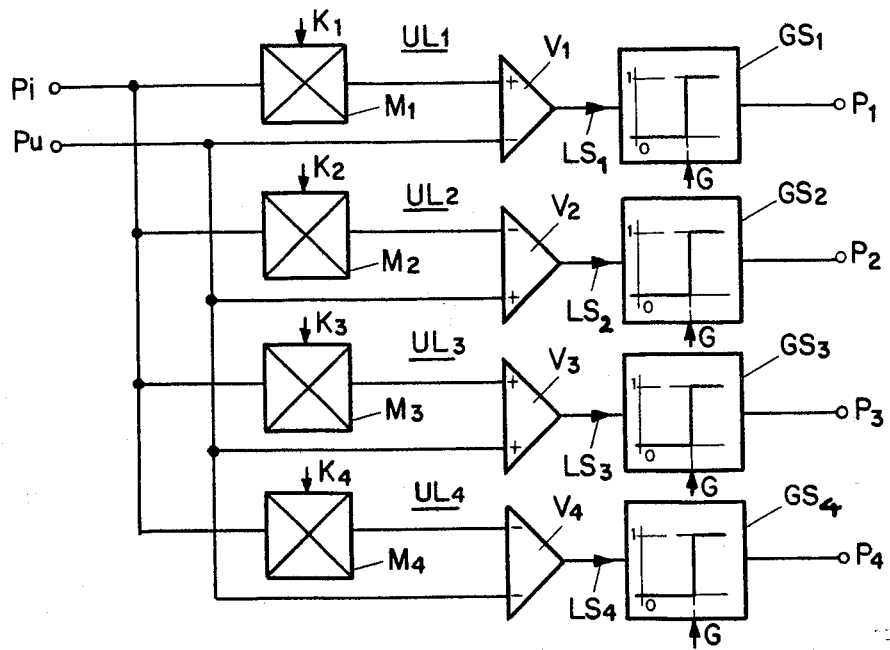
FIG. 9 is a principle circuit diagram for forming linear combinations from current and voltage surge signals with subsequent threshold value comparison.

FIG. 9 illustrates a circuit for generating suitable, linear trip boundaries corresponding to a quadrilateral or square configuration according to FIGS. 5 and 6. At the circuit points or terminals Pi and Pu, in this case, there are connected four superimposing circuits $UL_1$, $UL_2$, $UL_3$ and $UL_4$, each provided with a related respective multiplier $M_1$, $M_2$, $M_3$ and $M_4$ for introducing a constant factor $K_1$, $K_2$, $K_3$ and $K_4$, respectively, for forming linear combination signals $Ls_1$, $Ls_2$, $Ls_3$ and $Ls_4$. The superimposing circuits $UL_1$, $UL_2$, $UL_3$ and $UL_4$ contain at the output side thereof the threshold value or limit switches $GS_1$, $GS_2$, $GS_3$ and $GS_4$. The latter perform a comparison of the linear combination signals with threshold or limit values G, assumed to be coincident, and thus deliver at the outputs $P_1$, $P_2$, $P_3$ and $P_4$ binary signals upon exceeding a respective one of the trip boundaries $G_1$, $G_2$, $G_3$ and $G_4$ according to FIGS. 5 and 6. To this end there are provided at the superimposing circuits $UL_1$, $UL_2$, $UL_3$ and $UL_4$ the subtracting amplifiers $V_1$, $V_2$ and the summing amplifiers $V_3$, $V_4$, in which the current and voltage surge signals—after weighting by means of the multipliers $M_1$ to $M_4$—are superimposed in the four quadrants with the same sign or opposite sign in accordance with the position and inclination of the trip boundaries $G_1$ to $G_4$.

Figure 10:
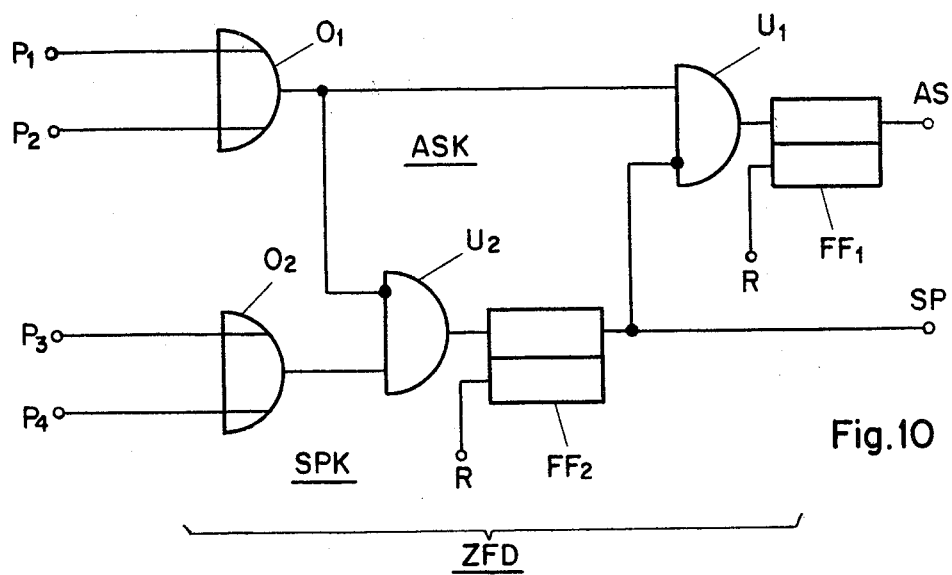
FIG. 10 illustrates a principle circuit diagram of a time sequence-discriminator for the fault direction detection for connection with the binary output of a circuit of the type shown in FIG. 9.

Finally, FIG. 10 illustrates a time sequence-discriminator for the previously mentioned differentiation between forward-fault conditions and reverse-fault conditions, wherein the discriminator inputs are connected to the outputs $P_1$, $P_2$, $P_3$ and $P_4$ of the circuit of FIG. 9. The circuit of the time sequence-discriminator, generally designated in its entirety by reference character ZFD, encompasses a trip channel ASK and a blocking channel SPK and a first OR-gate $O_1$ and a second OR-gate $O_2$, at the inputs of which there are connected in each case the superimposing signals, of the opposite sign or of the same sign, as the case may be, in the form of a related binary signal delivered by the threshold value switches $GS_1$ to $GS_4$. By means of the AND-gates or circuits $U_1$ and $U_2$, each having a respective inverse input, the trip and blocking channels are locked with respect to one another in favor of the initially responding channel, so that upon fault occurrence in the forward direction only the trip output AS delivers an appropriate binary signal and with a reverse fault condition only blocking output SP delivers a corresponding binary signal. The flipflops $FF_1$ and $FF_2$ serve in this connection for maintaining the signal after possible decay of the fault signals. By means of resetting inputs R of such storage element it is possible to inactivate both of the outputs AS and SP in the quiescent or steady state.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A method for selectively detecting at least faults or fault direction, or both, at electrical lines, comprising the steps of:
   generating current surge signals and voltage surge signals, in accordance with the change as a function of time of line current and line voltage, respectively, in relation to the steady state course of the current and voltage, respectively;
   comparing the formed current surge signals and voltage surge signals with a threshold value;
   said comparison step including comparing at least one of the surge signals with at least one threshold value which is dependent upon the other surge signal; and
   upon exceeding or falling below the threshold value deriving a trip signal or blocking signal for a protective device.

2. The method as defined in claim 1, wherein: said comparison step includes a sign comparison.

3. The method as defined in claim 1, wherein:
   the comparison step includes comparing at least one surge signal with a threshold value which is dependent upon the other surge signal in accordance with a predetermined threshold value function; and
   said threshold value function, when considered with respect to a coordinate system formed by both surge signals as the coordinates, extending at least in sections at an inclination angle towards one of the coordinate axes and in spaced relationship from the coordinate-null point.

4. The method as defined in claim 3, further including the steps of:
   utilizing four pairs of current and voltage threshold value functions or four combination signals where the current and voltage surge signals occur with four possible combinations of sign weighting; and
   forming a trip region in the coordinate system which is bounded in the four quadrants of the coordinate system by a respective trip boundary extending at a spacing from the coordinate-null point and inclined towards the coordinate axes.

5. The method as defined in claim 3, further including the steps of:
   forming from a current surge signal and a voltage surge signal at least one combination signal; and
   carrying out a threshold value comparison of the combination signal with a predetermined threshold value.

6. The method as defined in claim 5, wherein:
   said predetermined threshold value constitutes a fixed threshold value.

7. The method as defined in claim 5, further including the steps of:
   utilizing four pairs of current and voltage threshold value functions or four combination signals where the current and voltage surge signals occur with four possible combinations of sign weighting; and forming a trip region in the surge signal-coordinate system which is bounded in the four quadrants of the coordinate system by a respective trip boundary extending at a spacing from the coordinate-null point and inclined towards the coordinate axes.

8. The method as defined in claim 1, further including the steps of:

additionally carrying out a comparison of any one of a current surge signal or voltage surge signal with a fixed threshold value.

9. The method as defined in claim 1, further including the steps of:

additionally carrying out a sign comparison of a current surge signal and a voltage surge signal.

10. An apparatus for selectively detecting faults or fault direction, or both, at electrical lines, comprising:

a current measuring converter having an output side;

a voltage measuring converter having an output side;

each said current measuring converter and voltage measuring converter being operatively connected with the line;

a current signal-transmission channel connected with the output side of said current measuring converter;

a voltage signal-transmission channel connected with the output side of said voltage measuring converter;

said current signal-transmission channel comprising a current surge-signal transmitter;

said voltage signal-transmission channel comprising a voltage surge-signal transmitter;

a function generator connected at least at one of said signal transmission channels following the related surge signal transmitter;

each of said signal transmission channels having respective output means;

a comparison circuit connected with said output means of both signal transmission channels; and said comparison circuit containing a fault detection output for a subsequently arranged protective circuit.

11. The apparatus as defined in claim 10, including:

at least one superimposing circuit having subsequently connected threshold value switch means with which there is connected the outputs of both surge signal transmitters.

12. The apparatus as defined in claim 11, wherein:

said superimposing circuit comprises at least any one of a summing element or subtracting element for forming a linear combination signal from the current surge signal and voltage surge signal.

13. The apparatus as defined in claim 12, wherein:

said superimposing circuit further includes at least one constant multiplier.

14. The apparatus as defined in claim 11, further including:

time sequence-discriminator means;

said at least one superimposing circuit including a superimposing circuit having sign opposed superimposing of a current and a voltage surge signal and arranged forwardly of the output of at least one of the threshold value switches;

said at least one superimposing circuit further including a superimposing circuit having the same sign superimposing of a current and a voltage surge signal and arranged forwardly of at least one further threshold value switch; and the output of said at least one threshold value switch and said further threshold value switch being connected with said time sequence-discriminator means.

15. The apparatus as defined in claim 14, further including:

two of said superimposing circuits each having inverse sign-opposed superimposing of a current surge signal and a voltage surge signal;

a first OR-circuit with which there are connected said two superimposing circuits;

two further ones of said superimposing circuits each having positive or negative superimposing of the same sign of a current surge signal and a voltage surge signal;

a second OR-circuit;

said two further superimposing circuits being connected by means of subsequently arranged threshold value switches at said second OR-circuit; and said first OR-circuit and said second OR-circuit having their outputs connected with the time sequence-discriminator.

16. The apparatus as defined in claim 15, wherein:

said time sequence-discriminator means comprises a trip channel and a blocking channel;

said trip channel of said threshold value switch having operatively associated therewith at least one superimposing circuit which functions with respect to the current and voltage surge signals opposite in sign;

the blocking channel of the threshold value switch having operatively associated therewith at least one superimposing circuit which functions with respect to the current and voltage surge signals with the same sign; and said tripping channel and said blocking channel being locked relative to one another in favor of the first channel which responds in time.

17. The apparatus as defined in claim 12, further including:

time sequence-discriminator means;

said at least one superimposing circuit including a superimposing circuit having sign opposed superimposing of a current and a voltage surge signal and arranged forwardly of the output of at least one of the threshold value switches;

said at least one superimposing circuit further including a superimposing circuit having the same sign superimposing of a current and a voltage surge signal and arranged forwardly of at least one further threshold value switch; and the output of said at least one threshold value switch and said further threshold value switch being connected with said time sequence-discriminator means.

18. The apparatus as defined in claim 17, further including:

two of said superimposing circuits each having inverse sign-opposed superimposing of a current surge signal and a voltage surge signal;

a first OR-circuit with which there are connected said two superimposing circuits;

two further ones of said superimposing circuits each having positive or negative superimposing of the same sign of a current surge signal and a voltage surge signal;

a second OR-circuit;
said two further superimposing circuits being connected by means of subsequently arranged threshold value switches at said second OR-circuit; and
said first OR-circuit and said second OR-circuit having their outputs connected with the time sequence-discriminator.

19. The apparatus as defined in claim 18, wherein:
said time sequence-discriminator means comprises a trip channel and a blocking channel;
said trip channel of said threshold value switch having operatively associated therewith at least one superimposing circuit which functions with respect to the current and voltage surge signals opposite in sign;
the blocking channel of the threshold value switch having operatively associated therewith at least one superimposing circuit which functions with respect to the current and voltage surge signals with the same sign; and
said tripping channel and said blocking channel being locked relative to one another in favor of the first channel which responds in time.

* * * * *